(12) United States Patent
Fritze et al.

(10) Patent No.: US 6,537,943 B1
(45) Date of Patent: Mar. 25, 2003

(54) CATALYST SYSTEM COMPOSED OF METALLOCENES COMPRISING SUBSTITUENTS CONTAINING FLUORINE

(75) Inventors: Cornelia Fritze, Frankfurt (DE); Gerhard Erker, Münster (DE); Johannes Ruwwe, Münster (DE)

(73) Assignee: Targor GmbH, Mainz (DE)

( * ) Notice: Subject to any disclaimer, the term of this patent is extended or adjusted under 35 U.S.C. 154(b) by 0 days.

(21) Appl. No.: 09/673,147

(22) PCT Filed: Apr. 16, 1999

(86) PCT No.: PCT/EP99/02562
§ 371 (c)(1),
(2), (4) Date: Oct. 11, 2000

(87) PCT Pub. No.: WO99/54367
PCT Pub. Date: Oct. 28, 1999

(30) Foreign Application Priority Data

Apr. 21, 1998 (DE) .......................................... 198 17 725
Apr. 21, 1998 (DE) .......................................... 198 17 726

(51) Int. Cl.[7] .............................. C08F 4/16; C08F 4/44; B01J 31/38
(52) U.S. Cl. ..................... 502/152; 502/104; 502/117; 526/129; 526/160; 526/943; 556/53
(58) Field of Search ................................. 526/126, 160, 526/943, 129; 502/104, 117, 152; 556/53

(56) References Cited

FOREIGN PATENT DOCUMENTS

EP    0 791 607 A2 *  8/1997

OTHER PUBLICATIONS

J. Org.Chem.1963,1,98–100, Treichel et al.
J.Am.Chem.Soc.1986,108,4228–4229,Gassman et al.
J.Org.Chem.553(1998)173–178,Jany et al.
XP002112498 Derwent Abst., Mitsubishi Kasei Corp.
J.Org.Chem.,2(1964) 206–212,Treichel et al.
Nachr.Chem.Tech.Lab.41(1993)Nr.11,1220–1228, Bochman.
Org.1991,10,3910–3918,Horton.
Angew.Chem.1995,107,Nr.16,Erker et al.,1867–1869.

* cited by examiner

Primary Examiner—Peter D. Mulcahy
Assistant Examiner—R. Harlan
(74) Attorney, Agent, or Firm—Keil & Weinkauf

(57) ABSTRACT

The invention relates to a catalyst system composed of metallocenes comprising substituents containing fluorine, a method for producing said system and its use for the polymerization of olefins.

6 Claims, No Drawings

CATALYST SYSTEM COMPOSED OF METALLOCENES COMPRISING SUBSTITUENTS CONTAINING FLUORINE

The present invention relates to a catalyst system comprising metallocenes having fluorine-containing substituents, a process for preparing it and its use for the polymerization of olefins.

One of the first reactions in which a metallocene of transition group IV containing fluorine-containing ligands is reacted is the flash pyrolysis of $Cp_2Ti(C_6F_5)_2$ (J. Organomet. Chem. 1963, 1, 98; J. Organomet. Chem. 1964, 2, 206). Here, migration of a fluorine atom occurs.

Perfluorinated ligands play an important role in the stabilization of electron-deficient metal centers. For example, cationic metallocenes are stabilized in the Ziegler-Natta polymerization by perfluorinated tetraphenylborates (M. Bochmann, Nachr. Chem. Lab. Techn. 1993, 41, 1220).

An electron-deficient metal center can also be stabilized by means of a partially fluorinated anion in the reaction of dimethylzirconocene compounds with $[PhMe_2NH]^+[B(C_6H_4F)_4]^-$ (Organometallics 1991, 10, 3910). The coordination of an F atom of the anion to the metal center can be confirmed by means of $^{19}F$-NMR spectroscopy.

The reaction of butadiene(zirconocene) with the Lewis acid $B(C_6F_5)_3$ gives a betaine in which the cationic metal center is stabilized by coordination of a fluorine atom of the pentafluorophenyl radical (Angew. Chem. 1995, 107, 1867). In this case, the coordination is only weak, so that the labile ligand can be displaced by monomers.

The compounds mentioned up to now describe interactions of cationic metallocenes with aromatic fluorine-containing ligands. The use of partially fluorinated or perfluorinated aliphatic substituents on cyclopentadienyl ligands of the metallocenes has only been described in isolated cases.

Thus, a titanocene in which a trifluoromethyl group is bound to a cyclopentadienyl ligand is known (JACS 1986, 108, 4228).

Intramolecular coordination of a fluorine atom to the metal center is hardly possible here because of the geometry.

It is an object of the present invention to provide a catalyst system comprising metallocenes having fluorine-containing substituents.

We have found that this object is achieved by a catalyst system which comprises at least one metallocene having fluorine-containing substituents and at least one cocatalyst component and may be supported, and by a process for preparing it and its use in the polymerization of propylene.

The catalyst system of the present invention comprises
(a) at least one cocatalyst,
(b) at least one organometallic compound of the formula (I)

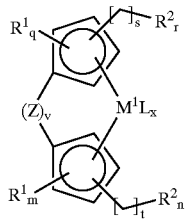

where
$M^1$ is a metal of group 3, 4, 5 or 6 of the Periodic Table of the Elements or a lanthanide or actinide, $R^1$ are identical or different and are each a hydrogen atom, a $C_1$–$C_{30}$ group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, $C_1$–$C_{12}$-alkoxy, $SiR^3$, where $R^3$ are identical or different and are each a hydrogen atom or a $C_1$–$C_{40}$ group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or two or more radicals $R^1$ may be joined to one another in such a way that the radicals $R^1$ and the atoms of the cyclopentadienyl ring which connect them form a $C_4$–$C_{24}$ ring system which may in turn be substituted, $R^2$ are identical or different and are each fluorine-containing $C_1$–$C_{25}$-alkyl, fluorine-containing $C_1$–$C_{25}$-alkenyl, fluorine-containing $C_6$–$C_{24}$-aryl, fluorine-containing $C_7$–$C_{30}$-arylalkyl or fluorine-containing $C_7$–$C_{30}$-alkylaryl, r, n are identical or different and are 1, 2, 3, 4 or 5, m, q are identical or different and are 0, 1, 2, 3 or 4, q+r is 5 when v=0, and q+r is 4 when v=1, m+n is 5 when v=0, and m+n is 4 when v=1, s, t are identical or different and are each an integer from 1 to 20, L are identical or different and are each a halogen atom or a hydrocarbon-containing radical having 1–20 carbon atoms, e.g. $C_1$–$C_{20}$-alkyl, $C_2$–$C_{20}$-alkenyl, $C_1$–$C_{20}$-alkoxy, $C_6$–$C_{14}$-aryloxy or $C_6$–$C_{40}$-aryl, x is an integer from 1 to 4, with x preferably being 2 when $M^1$=Ti, Zr or Hf, Z is a bridging structural element between the two cyclopentadienyl rings, and v is 0 or 1, and, if desired,
(c) at least one support.

Z is particularly preferably an $M^2R^4R^5$ group, where $M^2$ is carbon, silicon, germanium or tin and $R^4$ and $R^5$ are identical or different and are each a $C_1$–$C_{20}$-hydrocarbon group such as $C_1$–$C_{10}$-alkyl or $C_6$–$C_{14}$-aryl.

Z is preferably $CH_2$, $CH_2CH_2$, $CH(CH_3)CH_2$, $CH(C_4H_9)$ $C(CH_3)_2$, $C(CH_3)_2$, $(CH_3)_2Si$, $(CH_3CH_2)_2Si$, $(CH_3)$ $((CH_3)_3C)Si$, $(CH_3)_2Ge$, $(CH_3)_2Sn$, $(C_6H_5)_2Si$, $(C_6H_5)$ $(CH_3)Si$, $(C_6H_5)_2Ge$, $(C_6H_5)_2Sn$, $(CH_2)_4Si$, $CH_2Si$ $(CH_3)_2$, o-$C_6H_4$ or 2,2'-$(C_6H_4)_2$. It is also possible for Z together with one or more radicals $R^1$ and/or $R^2$ to form a monocyclic or polycyclic ring system.

Preference is given to chiral bridged metallocenes of the formula 1, in particular ones in which v is 1 and one or both cyclopentadienyl rings are substituted in such a way that they form an indenyl ring. The indenyl ring is preferably substituted, in particular in the 2 position, 4 position, 2,4,5 positions, 2,4,6 positions, 2,4,7 positions or 2,4,5,6 positions, by $C_1$–$C_{20}$ groups such as $C_1$–$C_{10}$-alkyl or $C_6$–$C_{20}$-aryl, where two or more substituents of the indenyl ring can also together form a ring system.

In formula (I), it is particularly preferred that
$M^1$ is a metal of group 4 of the Periodic Table of the Elements, e.g. Ti, Zr or Hf, $R^1$ are identical or different and are each a hydrogen atom, a $C_1$–$C_{30}$ group such as $C_1$–$C_{25}$-alkyl, in particular methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$- arylalkyl, $C_7$–$C_{30}$-alkylaryl or $C_1$–$C_{12}$-alkoxy, $SiR^3$, where $R^3$ are identical or different and are each a hydrogen atom or a $C_1$–$C_{40}$ group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or two or more radicals $R^1$ may be joined to one another in such a way that the radicals $R^1$ and the atoms of the cyclopentadienyl ring which connect them form a $C_4$–$C_{24}$ ring system which may in turn be substituted, $R^2$ are identical or different and are each fluorine-containing $C_1$–$C_{25}$-alkyl, fluorine-containing $C_1$–$C_{25}$-alkenyl, fluorine-containing $C_6$–$C_{24}$-aryl, fluorine-containing $C_7$–$C_{30}$-arylalkyl or fluorine-containing $C_7$–$C_{30}$-alkylaryl, r, n are identical or different and are 1, 2, 3, 4 or 5, m, q are identical or different and are 0, 1, 2, 3 or 4, q+r is 5 when v=0, and q+r is 4 when v=1, m+n is 5 when v=0, and m+n is 4 when v=1, s, t are identical or different and are each an integer from 1 to 20, L are identical or different and are each a halogen atom or a hydrocarbon-containing radical having 1–20 carbon atoms, in particular $C_1$–$C_{20}$-alkyl, $C_2$–$C_{20}$-alkenyl, $C_1$–$C_{20}$-alkoxy, $C_6$–$C_{14}$-aryloxy or $C_6$–$C_{40}$-aryl, x is an integer from 1 to 4, with x preferably being 2 when $M^1$=Ti, Zr or Hf Z is a bridging structural element between the two cyclopentadienyl rings, and v is 0 or 1.

Illustrative but nonlimiting examples of organometallic compounds used according to the present invention are:

bis($\eta^5$-2', 2', 2'-trifluoroethyl)cyclopentadienyl)titanium dichloride bis($\eta^5$-1'H, 1'H, 2'H, 2'H-perfluorooctylcyclopentadienyl)titanium dichloride bis($\eta^5$-1'H, 1'H, 2'H, 2'H-perfluorohexylcyclopentadienyl)titanium dichloride bis($\eta^5$-3'-(trifluoromethyl)-3', 4', 4', 4'-tetrafluorobutylcyclopentadienyl)titanium dichloride bis($\eta^5$-2', 2', 2'-trifluoroethyl)cyclopentadienyl)zirconium dichloride bis($\eta^5$-1'H, 1'H, 2'H, 2'H-perfluorooctylcyclopentadienyl)zirconium dichloride bis($\eta^5$-1'H, 1'H, 2'H, 2'H-perfluorohexylcyclopentadienyl)zirconium dichloride bis($\eta^5$-3'-(trifluoromethyl)-3', 4', 4', 4'-tetrafluorobutylcyclopentadienyl)zirconium dichloride bis($\eta^5$-2', 2', 2'-trifluoroethyl)cyclopentadienyl)hafnium dichloride bis($\eta^5$-1'H, 1'H, 2'H, 2'H-perfluorooctylcyclopentadienyl)hafnium dichloride bis($\eta^5$-1'H, 1'H, 2'H, 2'H-perfluorohexylcyclopentadienyl)hafnium dichloride bis($\eta^5$-3'-(trifluoromethyl)-3', 4', 4', 4'-tetrafluorobutylcyclopentadienyl)hafnium dichloride ($\eta^5$-2', 2', 2'-trifluoroethyl)cyclopentadienyl)($\eta^5$-cyclopentadienyl)titanium dichloride ($\eta^5$-1'H, 1'H, 2'H, 2'H-perfluorooctylcyclopentadienyl)($\eta^5$-cyclopentadienyl)titanium dichloride ($\eta^5$-1'H, 1'H, 2'H, 2'H-perfluorohexylcyclopentadienyl) ($\eta^5$-cyclopentadienyl)titanium dichloride ($\eta^5$-3'-(trifluoromethyl)-3', 4', 4', 4'-tetrafluorobutylcyclopentadienyl)($\eta^5$-cyclopentadienyl)titanium dichloride ($\eta^5$-2', 2', 2'-trifluoroethyl)cyclopentadienyl)($\eta^5$-cyclopentadienyl)zirconium dichloride ($\eta^5$-1'H, 1'H, 2'H, 2'H-perfluorooctylcyclopentadienyl)($\eta^5$-cyclopentadienyl)zirconium dichloride ($\eta^5$-1'H, 1'H, 2'H, 2'H-perfluorohexylcyclopentadienyl)($\eta^5$-cyclopentadienyl)zirconium dichloride ($\eta^5$-3'-(trifluoromethyl)-3', 4', 4', 4'-tetrafluorobutylcyclopentadienyl)($\eta^5$-cyclopentadienyl)zirconium dichloride ($\eta^5$-2', 2', 2'-trifluoroethyl)cyclopentadienyl)($\eta^5$-cyclopentadienyl)hafnium dichloride ($\eta^5$-1'H, 1'H, 2'H, 2'H-perfluorooctylcyclopentadienyl)($72^5$-cyclopentadienyl)hafnium dichloride ($\eta^5$-1'H, 1'H, 2'H, 2'H-perfluorohexylcyclopentadienyl)($\eta^5$-cyclopentadienyl)hafnium dichloride ($\eta^5$-3'-(trifluoromethyl)-3',4',4',4'-tetrafluorobutylcyclopentadienyl)($\eta^5$-cyclopentadienyl)hafnium dichloride ($\eta^5$-2', 2', 2'-trifluoroethyl)cyclopentadienyl)($\eta^5$-pentamethylcyclopentadienyl)titanium dichloride ($\eta^5$-1'H, 1'H, 2'H, 2'H-perfluorooctylcyclopentadienyl)($\eta^5$-pentamethylcyclopentadienyl)titanium dichloride ($\eta^5$-2', 2', 2'-trifluoroethyl)cyclopentadienyl)($\eta^5$-pentamethylcyclopentadienyl)zirconium dichloride ($\eta^5$-1'H, 1'H, 2'H, 2'H-perfluorooctyicyclopentadienyl)($\eta^5$-pentamethylcyclopentadienyl)zirconium dichloride ($\eta^5$-2', 2', 2'-trifluoroethyl)cyclopentadienyl)($\eta^5$-pentamethylcyclopentadienyl)hafnium dichloride ($\eta^5$-1'H, 1'H, 2'H, 2'H-perfluorooctylcyclopentadienyl)($\eta^5$-pentamethylcyclopentadienyl)hafnium dichloride ($\eta^5$-2', 2', 2'-trifluoroethyl)cyclopentadienyl)($\eta^5$-methylcyclopentadienyl)titanium dichloride ($\eta^5$-1'H, 1'H, 2'H, 2'H-perfluorooctylcyclopentadienyl)($\eta^5$-methylcyclopentadienyl)titanium dichloride ($\eta^5$-2', 2', 2'-trifluoroethyl)cyclopentadienyl)($\eta^5$-methylcyclopentadienyl)zirconium dichloride ($\eta^5$-1'H, 1'H, 2'H, 2'H-perfluorooctylcyclopentadienyl)($\eta^5$-methylcyclopentadienyl)zirconium dichloride ($\eta^5$-2', 2', 2'-trifluoroethyl)cyclopentadienyl)($\eta^5$-methylcyclopentadienyl)hafnium dichloride ($\eta^5$-1'H, 1'H, 2'H, 2'H-perfluorooctylcyclopentadienyl)($\eta^5$-methylcyclopentadienyl)hafnium dichloride dimethylsilanediyl($\eta^5$-3-(2', 2', 2'-trifluoroethyl)cyclopentadienyl)($\eta^5$-3-methylcyclopentadienyl)titanium dichloride dimethylsilanediyl($\eta^5$-3-(1'H, 1'H, 2'H, 2'H-perfluorooctyl)cyclopentadienyl)($\eta^5$-3-methylcyclopentadienyl)titanium dichloride dimethylsilanediyl($\eta^5$-3-(2', 2', 2'-trifluoroethyl)cyclopentadienyl)($\eta^5$-3-methylcyclopentadienyl)zirconium dichloride dimethylsilanediyl($\eta^5$-3-(1'H, 1'H, 2'H, 2'H-perfluorooctyl)cyclopentadienyl)($\eta^5$-3-methylcyclopentadienyl)zirconium dichloride dimethylsilanediyl($\eta^5$-3-(2', 2', 2'-trifluoroethyl)cyclopentadienyl)($\eta^5$-3-methylcyclopentadienyl)hafnium dichloride dimethylsilanediyl($\eta^5$-3-(1'H, 1'H, 2'H, 2'H-perfluorooctyl)cyclopentadienyl)($\eta^5$-3-methylcyclopentadienyl)hafnium dichloride dimethylsilanediyl($\eta^5$-3-(2', 2', 2'-trifluoroethyl)cyclopentadienyl)($\eta^5$-cyclopentadienyl)titanium dichloride dimethylsilanediyl($\eta^5$-3-(1'H, 1'H, 2'H, 2'H-perfluorooctyl)cyclopentadienyl)($\eta^5$-cyclopentadienyl)titanium dichloride dimethylsilanediyl($\eta^5$-3-(2', 2', 2'-trifluoroethyl)cyclopentadienyl)($\eta^5$-cyclopentadienyl)zirconium dichloride dimethylsilanediyl($\eta^5$-3-(1'H, 1'H, 2'H, 2'H-perfluorooctyl)cyclopentadienyl)($\eta^5$-cyclopentadienyl)zirconium dichloride dimethylsilanediyl($\eta^5$-3-(2', 2', 2'-trifluoroethyl)cyclopentadienyl)($\eta^5$-cyclopentadienyl)hafnium dichloride dimethylsilanediyl($\eta^5$-3-(1'H, 1'H, 2'H, 2'H-perfluorooctyl)cyclopentadienyl)($\eta^5$-cyclopentadienyl)hafnium dichloride 1,2-ethanediyl($\eta^5$-3-(2', 2', 2'-trifluoroethyl)cyclopentadienyl)($\eta^5$-3-methylcyclopentadienyl)titanium dichloride 1,2-ethanediyl($\eta^5$-3-(1'H, 1'H, 2'H, 2'H-perfluorooctyl)cyclopentadienyl)($\eta^5$-3-butylcyclopentadienyl)titanium dichloride 1,2-ethanediyl($\eta^5$-3-(2', 2', 2'-trifluoroethyl)cyclopentadienyl)($\eta^5$-3-butylcyclopentadienyl)zirconium dichloride 1,2-ethanediyl($\eta^5$-3-(1'H, 1'H, 2'H, 2'H-perfluorooctyl)cyclopentadienyl)($\eta^5$-3-butylcyclopentadienyl)zirconium dichloride 1,2-ethanediyl($\eta^5$-3- (2', 2', 2'-trifluoroethyl)cyclopentadienyl)($\eta^5$-3-butylcyclopentadienyl)hafnium dichloride 1,2-ethanediyl($\eta^5$-3-(1'H, 1'H, 2'H, 2'H-perfluorooctyl)cyclopentadienyl) ($\eta^5$-3-butylcyclopentadienyl)hafnium dichloride 1,2-ethanediyl($\eta^5$-3-(2', 2', 2'-trifluoroethyl)cyclopentadienyl)($\eta$5-3-methylcyclopentadienyl)titanium dichloride 1,2-ethanediyl($\eta^5$-3-(1'H, 1'H, 2'H, 2'H-perfluorooctyl)cyclopentadienyl)($\eta$5-3-methylcyclopentadienyl)titanium dichloride 1,2-ethanediyl($\eta^5$-3- (2', 2', 2'-trifluoroethyl)cyclopentadienyl)($\eta^5$-3-methylcyclopentadienyl)zirconium dichloride 1,2-ethanediyl($\eta^5$-3-(1'H, 1'H, 2'H, 2'H-perfluorooctyl)cyclopentadienyl)($\eta^5$-3-methylcyclopentadienyl)zirconium dichloride 1,2-ethanediyl($\eta^5$-3-(2', 2', 2'-trifluoroethyl)cyclopentadienyl)($\eta^5$-3-methylcyclopentadienyl)hafnium dichloride 1,2-ethanediyl($\eta^5$-3-(1'H, 1'H, 2'H, 2'H-perfluorooctyl)cyclopentadienyl)($\eta^5$-3-methylcyclopentadienyl)hafnium dichloride 1,2-ethanediyl($\eta^5$-3-(2', 2', 2'-trifluoroethyl)cyclopentadienyl)($\eta^5$-cyclopentadienyl)titanium dichloride 1,2-ethanediyl($\eta^5$-3-(1'H, 1'H, 2'H, 2'H-perfluorooctyl)cyclopentadienyl)($\eta$5-cyclopentadienyl)titanium dichloride 1,2-ethanediyl($\eta^5$-3-(2', 2', 2'-trifluoroethyl)cyclopentadienyl)($\eta^5$-cyclopentadienyl)zirconium dichloride 1,2-ethanediyl($\eta^5$-3-(1'H, 1'H, 2'H, 2'H-perfluorooctyl)cyclopentadienyl)($\eta^5$-cyclopentadienyl)zirconium dichloride 1,2-ethanediyl($\eta^5$-3-(2', 2', 2'-trifluoroethyl)cyclopentadienyl)($\eta^5$-cyclopentadienyl)hafnium dichloride 1,2-ethanediyl($\eta^5$-3-(1'H, 1'H, 2'H, 2'H-perfluorooctyl)cyclopentadienyl)($\eta^5$-cyclopentadienyl)hafnium dichloride 1,2-ethanediyl($\eta^5$-3-(2', 2', 2'-trifluoroethyl)cyclopentadienyl)($\eta^5$-3-methylcyclopentadienyl)titanium dichloride 1,2-ethanediyl($\eta^5$-3-(1'H, 1'H, 2'H, 2'H-perfluorooctyl)cyclopentadienyl)($\eta^5$-3-butylcyclopentadienyl)titanium dichloride 1,2-ethanediyl($\eta^5$-3-(2', 2', 2'-trifluoroethyl)cyclopentadienyl)($\eta^5$-3-butylcyclopentadienyl)zirconium dichloride 1,2-ethanediyl($\eta^5$-3-(1'H, 1'H, 2'H, 2'H-perfluorooctyl)cyclopentadienyl)($\eta^5$-3-butylcyclopentadienyl)zirconium dichloride 1,2-ethanediyl($\eta^5$-3-(2', 2', 2'-trifluoroethyl)cyclopentadienyl)($\eta^5$-3-butylcyclopentadienyl)hafnium dichloride 1,2-ethanediyl($\eta^5$-3-(1'H, 1'H, 2'H, 2'H-perfluorooctyl)cyclopentadienyl)($\eta^5$-3-butylcyclopentadienyl)hafnium dichloride dimethylsilanediylbis($\eta^5$-3-(2', 2', 2'-trifluoroethyl)cyclopentadienyl)zirconium dichloride dimethylsilanediylbis($\eta^5$-3-(2', 2', 2'-trifluoroethyl)cyclopentadienyl)titanium dichloride dimethylsilanediylbis($\eta^5$-3-(1'H, 1'H, 2'H, 2'H-perfluorooctyl)cyclopentadienyl)titanium dichloride dimethylsilanediylbis($\eta^5$-3-(1'H, 1'H, 2'H, 2'H-perfluorooctyl)cyclopentadienyl)zirconium dichloride dimethylsilanediylbis($\eta^5$-3-(2', 2', 2'-trifluoroethyl)cyclopentadienyl)hafnium dichloride dimethylsilanediylbis($\eta^5$-3-(1'H, 1'H, 2'H, 2'H-perfluorooctyl)cyclopentadienyl)hafnium dichloride ($\eta^5$-2', 2', 2'-trifluoroethyl)cyclopentadienyl)($\eta^5$-butylcyclopentadienyl)titanium dichloride ($\eta^5$-1'H, 1'H, 2'H, 2'H-perfluorooctylcyclopentadienyl)($\eta^5$-butylcyclopentadienyl)titanium dichloride ($\eta^5$-1'H, 1'H, 2'H, 2'H-perfluorohexylcyclopentadienyl)($\eta^5$-butylcyclopentadienyl)titanium dichloride ($\eta^5$-3'-(trifluoromethyl)-3', 4', 4', 4'-tetrafluorobutylcyclopentadienyl)($\eta^5$-butylcyclopentadienyl)titanium dichloride ($\eta^5$-2', 2', 2'-trifluoroethyl)cyclopentadienyl)($\eta^5$-butylcyclopentadienyl)zirconium dichloride ($\eta^5$-1'H, 1'H, 2'H, 2'H-perfluorooctylcyclopentadienyl)($\eta^5$-butylcyclopentadienyl)zirconium dichloride ($\eta^5$-1'H, 1'H, 2'H, 2'H-perfluorohexylcyclopentadienyl)($\eta^5$-butylcyclopentadienyl)zirconium dichloride ($\eta^5$-3'-(trifluoromethyl)-3', 4', 4', 4'-tetrafluorobutylcyclopentadienyl)($\eta^5$-butylcyclopentadienyl)zirconium dichloride ($\eta^5$-2', 2', 2'-trifluoroethyl)cyclopentadienyl)($\eta^5$-butylcyclopentadienyl)hafnium dichloride ($\eta^5$-1'H, 1'H, 2'H, 2'H-perfluorooctylcyclopentadienyl)($\eta^5$-butylcyclopentadienyl)hafnium dichloride ($\eta^5$-1'H, 1'H, 2'H, 2'H-perfluorohexylcyclopentadienyl)($\eta^5$-butylcyclopentadienyl)hafnium dichloride ($\eta^5$-3'-(trifluoromethyl)-3', 4', 4', 4'-tetrafluorobutylcyclopentadienyl)($\eta^5$-butylcyclopentadienyl)hafnium dichloride dimethylsilanediylbis($\eta^5$-2-(2', 2', 2'-trifluoroethyl)benzoindenyl)zirconium dichloride dimethylsilanediylbis($\eta^5$-2-(2', 2', 2'-trifluoroethyl)indenyl)zirconium dichloride dimethylsilanediylbis($\eta^5$-2-(2', 2', 2'-trifluoroethyl)-4-(1-naphthyl)indenyl)zirconium dichloride dimethylsilanediylbis($\eta^5$-2-(2', 2', 2'-trifluoroethyl)-4-(2-naphthyl)indenyl)zirconium dichloride dimethylsilanediylbis($\eta^5$-2-(2', 2', 2'-trifluoroethyl)-4-phenylindenyl)zirconium dichloride dimethylsilanediylbis($\eta^5$-2-(2', 2', 2'-trifluoroethyl)-4-phenylindenyl)zirconium dichloride dimethylsilanediylbis($\eta^5$-2-(2', 2', 2'-trifluoroethyl)-4,5-benzoindenyl)zirconium dichloride dimethylsilanediylbis($\eta^5$-2-(2', 2', 2'-trifluoroethyl)-4-(4'-tert-butylphenyl)indenyl)zirconium dichloride dimethylsilanediylbis($\eta^5$-2-(1'H, 1'H, 2'H, 2'H-perfluorooctyl)benzoindenyl)zirconium dichloride
dimethylsilanediylbis($\eta^5$-2-(1'H, 1'H, 2'H, 2'H-perfluorooctyl)indenyl)zirconium dichloride
dimethylsilanediylbis($\eta^5$-2-(1'H, 1'H, 2'H, 2'H-perfluorooctyl)-4-(1-naphthyl)indenyl)zirconium dichloride
dimethylsilanediylbis($\eta^5$-2-(1'H, 1'H, 2'H, 2'H-perfluorooctyl)-4-(2-naphthyl)indenyl)zirconium dichloride
dimethylsilanediylbis($\eta^5$-2-(1'H, 1'H, 2'H, 2'H-perfluorooctyl)-4-phenylindenyl)zirconium dichloride
dimethylsilanediylbis($\eta^5$-2-(1'H, 1'H, 2'H, 2'H-perfluorooctyl)-4-phenylindenyl)zirconium dichloride
dimethylsilanediylbis($\eta^5$-2-(1'H, 1'H, 2'H, 2'H-perfluorooctyl)-4,5-benzoindenyl)zirconium dichloride
dimethylsilanediylbis($\eta^5$-2-(1'H, 1'H, 2'H, 2'H-perfluorooctyl)-4-(4'-tert-butylphenyl)indenyl)zirconium dichloride Apart from the dichloride compounds, the dimethyl compounds are also of importance.

The compound of the formula (I) is prepared by reacting a substituted cyclopentadienide (II) obtained from the reaction of a metallocene with a fluorine- and iodine-containing alkyl with a metal compound (III); this is illustrated by way of example in the following reaction scheme.

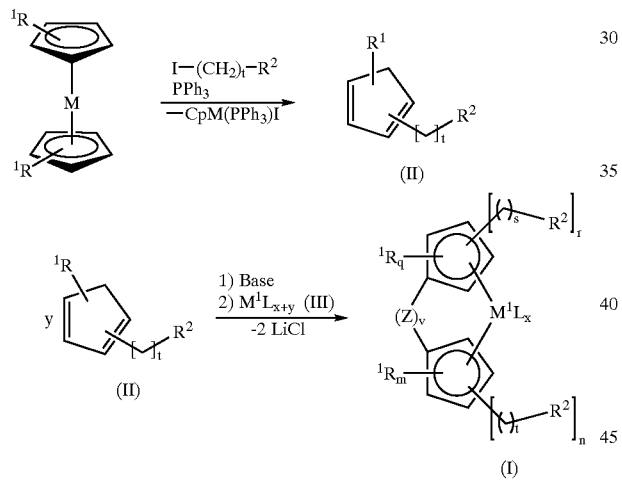

In this scheme, $M^1$, $R^1$, $R^2$, L, Z, m, n, q, r, s, t, v and x are as defined above for formula (I). y is 1 or 2 and M is a metal, particularly preferably nickel. The base is a strong base such as butyllithium or potassium hydride. The reaction is carried out at from −50° C. to +150° C., preferably from 0°C. to 100° C., in organic solvents such as toluene, benzene, methylene chloride, carbon tetrachloride, tetrahydrofuran, diethyl ether or petroleum spirit. The reaction takes from 1 minute to 20 days. The compound of the formula (I) can be isolated or used directly for further reactions. The compound of the formula (I) can also be prepared in a single-vessel reaction without isolation of intermediates and end products.

In addition to at least one metallocene of the formula (I), the catalyst system of the present invention further comprises at least one cocatalyst (component a).

The cocatalyst component comprises an aluminoxane, a Lewis acid or an ionic compound which reacts with the metallocene to convert it into a cationic compound.

As aluminoxane, preference is given to using a compound of the formula (IV)

 (IV).

Aluminoxanes can be cyclic as in formula (V)

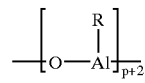

or linear as in formula (VI)

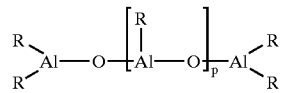

or of the cluster type as in formula (VII), as are described in recent literature, cf. JACS 117 (1995), 6465–74, Organometallics 13 (1994), 2957–2969.

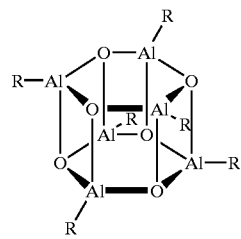

The radicals R in the formulae (V), (VI) and (VII) can be identical or different and may each be a $C_1$–$C_{20}$-hydrocarbon group such as a $C_1$–$C_6$-alkyl group, a $C_6$–$C_{18}$-aryl group, benzyl or hydrogen, and p is an integer from 2 to 50, preferably from 10 to 35.

The radicals R are preferably identical and are methyl, isobutyl, n-butyl, phenyl or benzyl, particularly preferably methyl.

If the radicals R are different, they are preferably methyl and hydrogen, methyl and isobutyl or methyl and n-butyl, with hydrogen or isobutyl or n-butyl preferably being present in a proportion of from 0.01 to 40% (number of radicals R).

Aluminoxanes are prepared as described in the literature (cf. Polyhedron 9 (1990) 429 and EP-A-302 424).

Regardless of the method of preparation, all aluminoxane solutions have a varying content of unreacted aluminum starting compound which is present in free form or as adduct.

As Lewis acid, preference is given to using at least one organoboron or organoaluminum compound containing $C_1$–$C_{20}$ groups such as branched or unbranched alkyl or haloalkyl groups, e.g. methyl, propyl, isopropyl, isobutyl or trifluoromethyl, unsaturated groups such as aryl or haloaryl, e.g. phenyl, tolyl, benzyl, p-fluorophenyl, 3,5-difluorophenyl, pentachlorophenyl, pentafluorophenyl, 3,4,5-trifluorophenyl and 3,5-di(trifluoromethyl)phenyl.

Examples of Lewis acids are trifluoroborane, tris(4-fluorophenyl)borane,
tris(3,5-difluorophenyl)borane, tris(4-fluoromethylphenyl)borane,
tris(pentafluorophenyl)borane, tris(3,5-difluorophenyl)borane and/or
tris(3,4,5-trifluorophenyl)borane, di(bis(pentafluorophenyl)boroxy)methylalane, di(bisphenylboroxy)methylalane, di(bis(pentafluorophenyl) boroxy)isopropylalane.

As ionic cocatalysts, preference is given to using compounds which contain a noncoordinating anion such as tetrakis(pentafluorophenyl)borate, tetraphenylborate, $SbF_6^-$, $CF_3SO_3^-$ or $ClO_4^-$. As cationic counterion, use is made of Lewis bases such as methylamine, aniline, dimethylamine, diethylamine, N-methylaniline, diphenylamine, N,N-dimethylaniline, trimethylamine, triethylamine, tri-n-butylamine, methyidiphenylamine, pyridine, p-bromo-N,N-dimethylaniline, p-nitro-N,N-dimethylaniline, triethylphosphine, triphenylphosphine, diphenylphosphine, tetrahydrothiophene and triphenylcarbenium.

Examples of such ionic compounds which can be used according to the present invention are
tributylammonium tetra(pentafluorophenyl)borate,
tributylammonium tetra(pentafluorophenyl)aluminate,
tributylammonium tetra(trifluoromethylphenyl)borate,
tributylammonium tetra(4-fluorophenyl)aborate,
N,N-dimethylanilinium tetrakis(pentafluorophenyl)borate,
N,N-dimethylanilinium tetrakis(pentafluorophenyl) aluminate,
di(propyl)ammonium tetrakis(pentafluorophenyl)borate,
di(cyclohexyl)ammonium tetrakis(pentafluorophenyl) borate,
triphenylcarbenium tetrakis(pentafluorophenyl)borate,
triphenylcarbenium tetrakis(pentafluorophenyl)aluminate,
ferrocenium tetrakis(pentafluorophenyl)borate and/or
ferrocenium tetrakis(pentafluorophenyl)aluminate.
Preference is given to triphenylcarbenium tetrakis (pentafluorophenyl)borate and/or
N,N-dimethylanilinium tetrakis(pentafluorophenyl)borate.

It is also possible to use mixtures of at least one Lewis acid and at least one ionic compound.

The catalyst system of the present invention may further comprise a support (component c). The support can be any organic or inorganic, inert solid, in particular a porous support such as talc, inorganic oxides and finely divided polymer powders such as polyolefins. Suitable inorganic oxides are, for example, silicon dioxide, aluminum oxide oxides and also mixed oxides of the two elements and corresponding oxide mixtures.

The support materials used have a specific surface area in the range from 10 $m^2/g$ to 1000 $m^2/g$, a pore volume in the range from 0.1 ml/g to 5 ml/g and a mean particle size of from 1 $\mu$m to 500 $\mu$m. Preference is given to supports having a specific surface area in the range from 50 $\mu$m to 500 $\mu$m, a pore volume in the range from 0.5 ml/g to 3.5 ml/g and a mean particle size in the range from 5 $\mu$m to 350 $\mu$m. Particular preference is given to supports having a specific surface area in the range from 200 $m^2/g$ to 400 $m^2/g$, a pore volume in the range from 0.8 ml/g to 3.0 ml/g and a mean particle size of from 10 $\mu$m to 200 $\mu$m.

If the support material used naturally has a low moisture content or residual solvent content, dehydration or drying before use can be omitted. If this is not the case, as when using silica gel as support material, dehydration or drying is advisable. The loss on ignition (LOI) should be 1% or less. The thermal dehydration or drying of the support material can be carried out under reduced pressure with simultaneous blanketing with inert gas, e.g. nitrogen. The drying temperature is in the range from 100° C. to 1000° C., preferably from 200° C. to 800° C. The parameter pressure is not critical in this case. The duration of the drying process can be from 1 to 24 hours. Shorter or longer drying times are possible, provided that establishment of equilibrium with the hydroxyl groups on the support surface can occur under the conditions chosen, which normally takes from 4 to 8 hours.

Dehydration or drying of the support material by chemical means is also possible, by reacting the adsorbed water and the hydroxyl groups on the surface with suitable modifying agents. The reaction with the modifying agent can convert all or some of the hydroxyl groups into a form which leads to no adverse interaction with the catalytically active centers. Suitable modifying agents are, for example, silicon halides and silanes, e.g. silicon tetrachloride, chlorotrimethylsilane, dimethylaminochlorosilane, amines such as phenyldimethylamine, pyridine or organometallic compounds of aluminum, boron and magnesium, e.g. trimethylaluminum, triethylaluminum, triisobutylaluminum, triethylborane, dibutylmagnesium. Chemical dehydration or modification of the support material can be carried out by reacting a suspension of the support material in a suitable solvent in the absence of air and moisture with the modifying agent in pure form or as a solution in a suitable solvent. Suitable solvents are aliphatic or aromatic hydrocarbons such as pentane, hexane, heptane, toluene or xylene. Modification is carried out at from 250° C. to 120° C., preferably from 50° C. to 70° C. Higher and lower temperatures are possible. The duration of the reaction is from 30 minutes to 20 hours, preferably from 1 to 5 hours. After chemical dehydration is complete, the support material is isolated by filtration under inert conditions, washed one or more times with suitable inert solvents as have been described above and subsequently dried in a stream of inert gas or under reduced pressure.

Organic support materials such as finely divided polyolefin powders, e.g. polyethylene, polypropylene or polystyrene, can also be used and should likewise be freed of adhering moisture, solvent residues or other impurities before use by means of appropriate purification and drying operations.

To prepare the supported catalyst system, at least one of the above-described metallocene components, at least one cocatalyst component and at least one support material are brought into contact in any order in a suitable solvent. The solvent is removed and the resulting supported metallocene catalyst system is dried to ensure that the solvent is completely or mostly removed from the pores of the support material. The supported catalyst is obtained as a free-flowing powder.

Examples of suitable solvents include alkanes such as pentane, isopentane, hexane, heptane, octane and nonane, cycloalkanes such as cyclopentane and cyclohexane, and aromatics such as benzene, toluene, ethylbenzene and diethylbenzene. Very particular preference is given to toluene.

The amounts of cocatalyst and metallocene used in the preparation of the supported catalyst system can be varied over a wide range. Preference is given to a molar ratio of cocatalyst to the transition metal in the metallocene of from 1:1 to 1000:1, very particularly preferably from 1:1 to 400:1.

The supported catalyst system prepared according to the present invention can either be used directly for the polymerization of olefins or be prepolymerized with one or more olefinic monomers before it is used in a polymerization process. The procedure for the prepolymerization of supported catalyst systems is described in WO 94/28034.

As additive, it is possible to add a small amount of an α-olefin such as styrene as activity-promoting component or of an antistatic, as described in U.S. Ser. No. 08/365,280, during or after the preparation of the supported catalyst system.

In addition, the present invention provides a process for preparing polyolefins by polymerization of olefins in the presence of the catalyst system of the present invention. The polymerization can be a homopolymerization or a copolymerization.

For the purposes of the present invention, polyolefins are polymers based on olefins of the formula $R^\alpha$—CH=CH—$R^\beta$, where $R^\alpha$ and $R^\beta$ are identical or different and are each a hydrogen atom, a halogen atom, an alkoxy, hydroxy, alkylhydroxy, aldehyde, carbonyl, carboxyl or carboxylic ester group or a saturated or unsaturated hydrocarbon radical having from 1 to 20 carbon atoms, in particular from 1 to 10 carbon atoms, which may be substituted by an alkoxy, hydroxy, alkylhydroxy, aldehyde, carbonyl, carboxyl or carboxylic ester group, or $R^\alpha$ and $R^\beta$ together with the atoms connecting them form one or more rings.

Examples of such olefins are 1-olefins such as ethene, propylene, 1-butene, 1-pentene, 1-hexene, 4-methyl-1-pentene or 1-octene, styrene, dienes such as 1,3-butadiene, 1,4-hexadiene, vinylnorbornene, norbornadiene or ethylnorbornadiene and cyclic olefins such as norbornene, tetracyclododecene or methylnorbornene.

It is also possible to copolymerize mixtures of the above olefins. In particular, propylene is homopolymerized or copolymerized.

The polymerization is preferably carried out at from –60 to 300° C., particularly preferably from 30 to 250° C. The pressure is from 0.5 to 2500 bar, preferably from 2 to 1500 bar.

The polymerization can be carried out continuously or batchwise, in one or more stages, in solution, in suspension, in the gas phase or in a supercritical medium. The supported system can be resuspended as powder or while still moist with solvent and be metered as a suspension in an inert suspension medium into the polymerization system.

A prepolymerization can be carried out with the aid of the catalyst of the present invention. Prepolymerization is preferably carried out using the propylene used in the polymerization.

To prepare polypropylene having a broad molecular weight distribution, preference is given to using catalyst systems which comprise two or more different metallocenes.

To remove catalyst poisons present in the olefin, purification using an aluminum alkyl, for example trimethylaluminum, triethylaluminum or triisobutylaluminum, is advantageous. This purification can either be carried out in the polymerization system itself or the olefin is brought into contact with the Al compound and subsequently separated off again before it is introduced into the polymerization system.

As molar mass regulator and/or to increase the activity, hydrogen is added if necessary. The total pressure in the polymerization system is from 0.5 to 2500 bar, preferably from 2 to 1500 bar.

The compound used according to the present invention is employed in a concentration, based on the transition metal, of preferably from $10^{-3}$ to $10^{-8}$ mol, preferably from $10^{-4}$ to $10^{-7}$ mol, of transition metal per $dm^3$ of solvent or per $dm^3$ of reactor volume.

Before addition of the catalyst system (comprising at least one metallocene according to the present invention), another alkylaluminum compound such as trimethylaluminum, triethylaluminum, triisobutylaluminum, trioctylaluminum or isoprenylaluminum can additionally be introduced into the reactor or added to the catalyst system to make the polymerization system inert (for example, to remove catalyst poisons present in the olefin). This additional alkylaluminum compound is added to the polymerization system in a concentration of from 100 to 0.01 mmol of Al per kg of reactor contents. Preference is given to using triisobutylaluminum and triethylaluminum in a concentration of from 10 to 0.1 mmol of Al per kg of reactor contents. This allows a small Al/M molar ratio to be used in the synthesis of a supported catalyst system.

EXAMPLE 1

Synthesis of bis(2', 2', 2'-trifluoroethylcyclopentadienyl) titanium dichloride

Synthesis of nickelocene 29.4 g of nickel powder are suspended in 400 ml of dimethoxyethane and admixed while stirring with 27.3 ml of bromine. The mixture is stirred for 1 hour and the solvent is removed in an oil pump vacuum. The brown residue obtained is taken up in 400 ml of diethylamine while cooling in ice and admixed with 98 ml of freshly distilled cyclopentadiene. The suspension becomes green. After stirring for 12 hours at room temperature, residual solvent is removed in an oil pump vacuum and the product is isolated by Soxhlet extraction with 700 ml of petroleum ether.

Yield: 74g (78%)

Melting point: 173.0° C.

Synthesis of 2', 2', 2'-trifluoroethylcyclopentadiene 6.87 g of nickelocene and 9.51 g of triphenylphosphine are dissolved in 60 ml of diethyl ether and admixed with 3.56 ml of 2,2,2-trifluoroethyl iodide. The solution becomes violet and is stirred for 48 hours. The contents of the Schlenk vessel are then condensed into a receiver cooled to –196° C. and the diethyl ether is distilled from this at a bath temperature of 45° C. until the temperature of the distillate is no longer 35° C.; the proportion of remaining diethyl ether is determined by means of $^1$H-NMR (1.95 eq).

Yield: 8.95 g (81%).

$^1$H-NMR: (d-chloroform; 200.1 MHz; 300 K): δ=6.46 (m, 6H, =CH); 3.15 (m, 4H, $CH_2$); 3.00 (m, 4H, $CH_2$ (ring), (the product consists of two double bond isomers)) ppm.

(The resonances of the diethyl ether present appear in addition: 3.45 (q); 1.18 (t) ppm).

$^{19}$F-NMR: (d-chloroform; 282.4 MHz; 300K): δ=–65.7 (t, $^3J_{HF}$=11.4 Hz); –65.9 (t, $^3J_{HF}$=11.5 Hz) ppm.

Synthesis of bis(2', 2', 2'-trifluoroethylcyclopentadienyl) titanium dichloride 14.6 mmol of 2', 2', 2'-trifluoroethylcyclopentadiene in tetrahydrofuran are admixed at –78° C. with 8.8 ml of 1.65 M butyllithium solution. In parallel thereto, 0.72 ml of titanium tetrachloride are dissolved in 50 ml of toluene and, at –78° C., slowly admixed with 40 ml of tetrahydrofuran. The suspension obtained is added to the above solution at –78° C. The mixture is allowed to warm slowly to room temperature, the solvent is removed in an oil pump vacuum and the product is extracted from the residue with methylene chloride.

Yield: 1g (37%)

$^1$H-NMR: ($d_6$-benzene; 200.1 MHz; 300 K): δ=5.91 (pt, 4H, RCpH); 5.28 (pt, 4H, RCpH); 3.52 (q, $^3J_{FH}$=11.0 Hz, 4H, 1'-H) ppm.

$^{19}$F-NMR: ($d_6$-benzene; 284.1 MHz; 300K): δ=–65.17 (s (1H decoupled)); (t, $^3J_{HF}$=11.5 HZ) (not decoupled)) ppm.

EXAMPLE 2

Synthesis of bis(2', 2', 2'-trifluoroethylcyclopentadienyl) zirconium dichloride 11.7 mmol of 2', 2', 2'-trifluoroethylcyclopentadiene from Example 1 in 80 ml of tetrahydrofuran are admixed at –78° C. with 7.1 ml of 1.65 M butyllithium solution in hexane. At –78° C., 2.22 g of zirconium tetrachloride-THF adduct dissolved in 30 ml of tetrahydrofuran are added to the resulting solution. The mixture is allowed to warm slowly to room temperature, the solvent is removed in an oil pump vacuum and the product is extracted from the residue with methylene chloride. Yield: 1.89 g (70%)

$^1$H-NMR: (d$_6$-benzene; 300.1 MHz; 300 K): δ=5.82 (pt, 4H, RCpH); 5.39 (pt, 4H, RCpH); 3.24 (q, $^3J_{FH}$=12.5 Hz, 4H, 1'-H) ppm.

$^{19}$F-NMR: (d$_6$-benzene; 284.1 MHz; 300K): δ=−65.14 (s ($^1$H decoupled)); (t, $^3J_{HF}$=11.5 Hz) (not decoupled)) ppm.

EXAMPLE 3
Synthesis of (2', 2', 2'-trifluoroethylcyclopentadienyl)(cyclopentadienyl)zirconium dichloride 1.8 mmol of 2', 2', 2'-trifluoroethylcyclopentadiene from Example 1 in tetrahydrofuran are admixed at −78° C. with 1.05 ml of 1.65 M butyllithium solution. A cooled suspension of 0.46 g of cyclopentadienylzirconium trichloride in 50 ml of tetrahydrofuran is added thereto. The mixture is allowed to warm slowly to room temperature, the solvent is removed in an oil pump vacuum and the product is extracted from the residue with methylene chloride.

Yield: 0.47 g (70%)

$^1$H-NMR: (d-chloroform; 200.1 MHz; 300 K): δ=6.49 (s, 5H, CpH); 6.38 (m, 4H, RCpH); 3.46 (q, $^3J_{FH}$=10.8 Hz, 2H, 1'-H) ppm.

$^{19}$F-NMR: (d-chloroform; 282.4 MHz; 300K): δ=−66.03 (s ($^1$H decoupled)); (t, $^3J_{HF}$=11.5 Hz) (not decoupled)) ppm.

EXAMPLE 4
Synthesis of bis(2', 2', 2'-trifluoroethylcyclopentadienyl) hafnium dichloride 5.18 mmol of 2', 2', 2'-trifluoroethylcyclopentadiene from Example 1 are admixed at −78° C. with 3.14 ml of 1.65 M butyllithium solution in hexane. 0.8 g of hafnium tetrachloride is added to the resulting solution at −78° C. The mixture is allowed to warm slowly to room temperature, the solvent is removed in an oil pump vacuum and the product is extracted from the residue with methylene chloride. Yield: 1.79 g (64%)

$^1$H-NMR: (d$_6$-benzene; 300.1 MHz; 300 K): δ=5.73 (pt, 4H, RCpH); 5.31 (pt, 4H, RCpH); 3.24 (q, $^3J_{FH}$=10.8 HZ, 4H, 1'-H) ppm.

$^{19}$F-NMR: (d$_6$-benzene; 282.4 MHz; 300K): δ=−65.8 (s ($^1$H decoupled)); (t, $^3J_{HF}$=11.5 HZ) (not decoupled)) ppm.

EXAMPLE 5
Synthesis of bis((1'H, 1'H, 2'H, 2'H-perfluorooctyl) cyclopentadienyl)titanium dichloride Synthesis of 1'H, 1'H, 2'H, 2'H-perfluorooctylcyclopentadiene 2.29 g of nickelocene from Example 1 and 3.17 g of triphenylphosphine are dissolved in 5 ml of diethyl ether and admixed with 3.0 ml of 1 H, 1 H, 2H, 2H-perfluorooctyl iodide. The solution becomes violet and is stirred for 48 hours. The supernatant solution is subsequently filtered, the precipitate is carefully washed and the solvent is then removed. The residue is chromatographed on a short column using pentane and the solvent is removed in an oil pump vacuum.

Yield: 3.67 g (74%)

$^1$H-NMR: (d-chloroform; 200.1 MHz; 300 K): δ=6.45; 6.39; 6.28; 6.22; 6.05 (each m, 3H, RCpH); 2.97 (pq, (1-isomer), 2.91 (psext, (2-isomer), together 4 H, CH2); 2.67 (m, 4H, 1'-H); 2.31 (m, 4H, 2'-H) ppm.

$^{19}$F-NMR: (d-chloroform; 282.4 MHz; 300K): δ=−81.24 (m, 3F, 8'-F); −114.77 (m, 2F, 3'-F); −122.07 (m, 2F, 4'-F); −123.06 (m, 2F, 7'-F); −123.67 (m, 2F, 6'-F) −126.37 (m, 2F, 5'F) ppm.

Synthesis of bis((1'H, 1'H, 2'H, 2'H-perfluorooctyl) cyclopentadienyl)titanium dichloride A solution of 0.75 g of 1'H, 1'H, 2'H, 2'H-perfluorooctylcyclopentadiene in 40 ml of tetrahydrofuran is admixed at −78° C. with 1.04 ml of 1.65 M butyllithium solution and then admixed with a cooled suspension of 0.168 g of titanium tetrachloride-THF adduct in 45 ml of tetrahydrofuran. The mixture is allowed to warm to room temperature and the solvent is removed under reduced pressure. The product is isolated by means of extraction with methylene chloride.

Yield: 0.1 g (12%)

$^1$H-NMR: (d-chloroform; 200.1 MHz; 300 K): δ=6.39 (pt, 4H, RCpH); 6.28 (pt, 4H, RCpH); 3.12 (m, 4H, 1'-H); 2.48 (m, 4H, 2'-H) ppm.

$^{19}$F-NMR: (d-chloroform; 282.4 MHz; 300K): δ=−81.0 (m, 6F, 8'-F); −114.3 (m, 4F, 3'-F); −122.1 (m, 4F, 4'-F); −123.1 (m, 4F, 7'-F); −123.6 (m, 4F, 6'-F); −126.3 (m, 4F, 5'-F) ppm.

EXAMPLE 6
Synthesis of bis((1'H, 1'H, 2'H, 2'H-perfluorooctyl) cyclopentadienyl)zirconium dichloride A solution of 0.98 g of 1'H, 1'H, 2'H, 2'H-perfluorooctylcyclopentadiene from Example 5 in 60 ml of tetrahydrofuran is admixed at −78° C. with 1.49 ml of 1.65 M butyllithium solution and then admixed with a cooled suspension of 0.426 g of zirconium tetrachloride-THF adduct in 40 ml of tetrahydrofuran. The mixture is allowed to warm to room temperature and the solvent is removed under reduced pressure. The product is isolated by means of extraction with methylene chloride.

Yield: 0.56 g (50%)

$^1$H-NMR: (d-chloroform; 200.1 MHz; 300 K): δ=6.33 (pt, 4H, RCpH); 6.24 (pt, 4H, RCpH); 2.98 (m, 4H, 1'-H); 2.09 (m, 4H, 2'-H) ppm.

$^{19}$F-NMR: (d-chloroform; 282.4 MHz; 300K): δ=−81.0 (m, 6F, 8'-F); −114.5 (m, 4F, 3'-F); −122.0 (m, 4F, 4'-F); −123.0 (m, 4F, 7'-F); −123.6 (m, 4F, 6'-F); −126.3 (m, 4F, 5'-F) ppm.

EXAMPLE 7
Synthesis of bis((1'H, 1'H, 2'H, 2'H-perfluorooctyl) cyclopentadienyl)hafnium dichloride A solution of 0.87 g of 1'H, 1'H, 2'H, 2'H-perfluorooctylcyclopentadiene from Example 5 in 60 ml of tetrahydrofuran is admixed at −78° C. with 1.21 ml of 1.65 M butyllithium solution and then admixed with a cooled suspension of 0.305 g of hafnium tetrachloride in 40 ml of tetrahydrofuran. The mixture is allowed to warm to room temperature and the solvent is removed under reduced pressure. The product is isolated by means of extraction with methylene chloride.

Yield: 0.38 g (38%)

$^1$H-NMR: (d$_6$-benzene; 200.1 MHz; 300 K): δ=5.57 (pt, 4H, RCpH); 5.47 (pt, 4H, RCpH); 2.86 (m, 4H, 1'-H); 2.10 (m, 4H, 2'-H) ppm.

$^{19}$F-NMR: (d$_6$-benzene; 282.4 MHz; 300K): δ=−81.2 (m, 6F, 8'-F); −114.5 (m, 4F, 3'-F); −121.9 (m, 4F, 4'-F); −122.9 (m, 4F, 7'-F); −123.4 (m, 4F, 6'-F); −126.2 (m, 4F, 5'-F) ppm.

EXAMPLE 8
Synthesis of ((1'H, 1'H, 2'H, 2'H-perfluorooctyl) cyclopentadienyl)(cyclopentadienyl)zirconium dichloride A solution of 1.31 g of 1'H, 1'H, 2'H, 2'H-perfluorooctylcyclopentadiene from Example 5 in 25 ml of tetrahydrofuran is admixed at −78° C. with 2 ml of 1.65M butyllithium solution and then admixed with a cooled suspension of 1.28 g of cyclopentadienylzirconium trichloride-THF adduct in 40 ml of tetrahydrofuran. The mixture is allowed to warm to room temperature and the solvent is removed under reduced pressure. The product is isolated by means of extraction with methylene chloride and pentane.

Yield: 1.73g (86%)

$^1$H-NMR: (d-chloroform; 200.1 MHz; 300 K): δ=6.47 (s, 5H, CpH); 6.32 (pt, 2H, RCpH); 6.23 (pt, 2H, RCpH); 2.98 (m, 2H, 1'H); 2.38 (m, 2H, 2'H) ppm.

$^{19}$F-NMR: (d-chloroform; 282.4 MHz; 300K): δ=−81.0 (m, 3F, 8'-F); −114.5 (m, 2F, 3'-F); −122.0 (m, 2F, 4'-F); −123.0 (m, 2F, 7'-F); −123.6 (m, 2F, 6'-F); −126.3 (m, 2F, 5'-F) ppm.

EXAMPLE 9

Synthesis of (1'H, 1'H, 2'H, 2'H-perfluorooctylcyclopentadienyl)(pentamethylcyclopentadienyl)zirconium dichloride A solution of 1.39 g of 1'H, 1'H, 2'H, 2'H-perfluorooctylcyclopentadiene from Example 5 in 50 ml of tetrahydrofuran is admixed at −78° C. with 2.1 ml of 1.65 M butyllithium solution and then admixed with a cooled suspension of 1.11 g of pentamethylcyclopentadienylzirconium trichloride in 30 ml of tetrahydrofuran. The mixture is allowed to warm to room temperature and the solvent is removed under reduced pressure. The product is isolated by means of extraction with methylene chloride and pentane.

Yield: 1.9 g (81%)

$^1$H-NMR: (d-chloroform; 200.1 MHz; 300 K): δ=6.06 (pt, 2H, RCpH); 5.94 (pt, 2H, RCpH); 3.72 (m, 2H, 1'-H); 2.97 (m, 2H, 2'-H); 2.02 (s, 15H, Cp(CH$_3$)$_5$) ppm.

$^{19}$F-NMR: (d-chloroform; 282.4 MHz; 300K): δ=−80.9 (m, 3F, 8'-F); −114.5 (m, 2F, 3'-F); −122.2 (m, 2F, 4'-F); −123.0 (m, 2F, 7'-F); −123.6 (m, 2F, 6'-F); −126.3 (m, 2F, 5'-F) ppm.

EXAMPLE 10

Synthesis of bis(2', 2', 2'-trifluoroethyl)cyclopentadienyl)dimethylzirconium 2.79 ml of 1.68 M methyllithium solution in diethyl ether are added slowly at −78° C. to a suspension of 1.05 g of bis(2', 2', 2'-trifluoroethyl)cyclopentadienyl)zirconium dichloride from Example 2 in 40 ml of diethyl ether. The mixture is allowed to warm to room temperature and the solvent is removed in an oil pump vacuum. The product is isolated by means of extraction with pentane. Yield: 0.614 g (73%)

$^1$H-NMR: (d$_6$-benzene; 200.1 MHz; 300 K): δ=5.62 (pt, 4H, RCpH); 5.21 (pt, 4H, RCpH); 2.87 (q, $^3J_{FH}$=10.6 Hz, 4H, 1'-H); −0.52 (s, 6H, Zr—CH$_3$) ppm.

EXAMPLE 11

Synthesis of (2', 2', 2'-trifluoroethylcyclopentadienyl)(cyclopentadienyl)dimethylzirconium 0.8 ml of 1.68 M methyllithium solution in diethyl ether is added slowly at −78° C. to a suspension of 0.252 g of (2', 2', 2'-trifluoroethylcyclopentadienyl)(cyclopentadienyl)zirconium dichloride from Example 3 in 25 ml of diethyl ether. The mixture is allowed to warm to room temperature and the solvent is removed in an oil pump vacuum. The product is isolated by means of extraction with pentane. Yield: 0.162 g (73%)

$^1$H-NMR: (d$_6$-benzene; 200.1 MHz; 300 K): δ=5.64 (s, 5H, CpH); 5.63 (pt, 2H, RCpH); 5.27 (pt, 2H, RCpH); 2.87 (q, $^3J_{FH}$=10.8 Hz, 2H, 1'-H); −0.32 (s, 6H, Zr—(CH$_3$) ppm.

EXAMPLE 12

Synthesis of bis((1'H, 1'H, 2'H, 2'H-perfluorooctyl)cyclopentadienyl)dimethylzirconium 1.04 ml of 1.68 M methyllithium solution in diethyl ether is added slowly at −78° C. to a suspension of 0.51 g of bis((1'H, 1'H, 2'H, 2'H-perfluorooctyl)cyclopentadienyl) titanium dichloride from Example 5 in 50 ml of diethyl ether. The mixture is allowed to warm to room temperature and the solvent is removed in an oil pump vacuum. The product is isolated by means of extraction with pentane.
Yield: 0.302 g (65%)

$^1$H-NMR: (d$_6$-benzene; 200.1 MHz; 300 K): δ=5.46 (pt, 4H, RCpH); 5.37 (pt, 4H, RCpH); 2.60 (m, 4H, 1'-H); 2.05 (m, 4H, 2'H); −0.29 (s, 6H, Zr—CH$_3$) ppm.

EXAMPLE 13

Synthesis of (1'H, 1'H, 2'H, 2'H-perfluorooctylcyclopentadienyl)(cyclopentadienyl)dimethylzirconium 1.03 ml of 1.68 M methyllithium solution in diethyl ether is added slowly at −78° C. to a suspension of 0.525 g of (1'H, 1'H, 2'H, 2'H-perfluorooctylcyclopentadienyl)(cyclopentadienyl)zirconium dichloride from Example 8 in 40 ml of diethyl ether. The mixture is allowed to warm to room temperature and the solvent is removed in an oil pump vacuum. The product is isolated by means of extraction with pentane. Yield: 0.257 g (55%)

$^1$H-NMR: (d$_6$-benzene; 200.1 MHz; 300 K): δ=5.70 (s, 5H, CpH); 5.45 pt, 2H, RCpH); 5.36 (pt, 2H, RCpH); 2.60 (m, 2H, 1'-H); 2.09 (m, 2H, 2'H); −0.21 (s, 6H, Zr—(CH$_3$)$_2$) ppm.

EXAMPLE 14

(1'H, 1'H, 2'H, 2'H-perfluorooctylcyclopentadienyl)(pentamethylcyclopentadienyl)dimethylzirconium 2.7 ml of 1.68 M methyllithium solution in diethyl ether are added slowly at −78° C. to a suspension of 1.9 g of (1'H, 1'H, 2'H, 2'H-perfluorooctylcyclopentadienyl)(pentamethylcyclopentadienyl)zirconium dichloride from Example 9 in 40 ml of diethyl ether. The mixture is allowed to warm to room temperature and the solvent is removed in an oil pump vacuum. The product is isolated by means of extraction with pentane. Yield: 1.33 g (74%)

$^1$H-NMR: (d$_6$-benzene; 200.1 MHz; 300 K): δ=5.51 (pt, 2H, RCpH); 5.28 (pt, 2H, RCpH); 2.74 (m, 2H, 1'-H); 2.13 (m, 2H, 2'-H); 1.67 (s, 15H, Cp(CH$_3$)$_5$); −0.44 (s, 6H, Zr—CH$_3$) ppm.

EXAMPLE 15

Synthesis of bis((2', 2', 2'-trifluoroethyl)cyclopentadienyl)dimethylhafnium 1.1 ml of 1.68 M methyllithium solution in diethyl ether is added slowly at −78° C. to a suspension of 0.5 g of bis((2, 2', 2'-trifluoroethyl)cyclopentadienyl)hafnium dichloride from Example 4 in 50 ml of diethyl ether. The mixture is allowed to warm to room temperature and the solvent is removed in an oil pump vacuum. The product is isolated by means of extraction with pentane.
Yield: 0.358 g (83%)

$^1$H-NMR: (d$_6$-benzene; 200.1 MHz; 300 K): δ=5.52 (pt, 4H, RCpH); 5.16 (pt, 4H, RCpH); 2.87 (q, $^3J_{FH}$=10.7 Hz, 4H, 1'-H); −0.71 (s, 6H, Hf—CH$_3$)ppm.

EXAMPLE 16

Synthesis of bis((1'H, 1'H, 2'H, 2'H-perfluorooctyl) cyclopentadienyl)dimethylhafnium 0.25 ml of 1.68 M methyllithium solution in diethyl ether is added slowly at −78° C. to a suspension of 0.222 g of bis((1'H, 1'H, 2'H, 2'H-perfluorooctyl)cyclopentadienyl) hafnium dichloride from Example 7 in 40 ml of diethyl ether. The mixture is allowed to warm to room temperature and the solvent is removed in an oil pump vacuum. The product is isolated by means of extraction with pentane.

Yield: 0.197 g (91%)

$^1$H-NMR: (d6-benzene; 200.1 MHz; 300 K): δ=5.38 (pt, 4H, RCpH); 5.31 (pt, 4H, RCpH); 2.59 (m, 4H, 1'-H); 2.08 (m, 4H, 2'-H); −0.47 (s, 6H, Hf—CH$_3$) ppm.

EXAMPLE 17
Polymerization of propene 200 ml of toluene and 19 ml of 10.5% strength methylaluminoxane solution in toluene are placed in a 1 l glass autoclave. 1 ml of 10.5% strength methylaluminoxane solution in toluene and 40 mg of bis((1'H, 1'H, 2'H, 2'H-perfluorooctyl)cyclopentadienyl)zirconium dichloride are added thereto. The polymerization temperature of 0° C. is subsequently set and the autoclave is pressurized with 2 bar of propene; the propene pressure is maintained during the polymerization by injection of further amounts. The polymerization is stopped by addition of 20 ml of methanol/2N hydrochloric acid (1:1). The polypropylene obtained is filtered off and dried in an oil pump vacuum.

Activity: 33 μ(mmol·bar·h)

EXAMPLE 18
Polymerization of propene 200 ml of toluene and 19 ml of 10.5% strength methylaluminoxane solution in toluene are placed in a 1 l glass autoclave. 1 ml of 10.5% strength methylaluminoxane solution in toluene and 15 mg of (1'H, 1'H, 2'H, 2'H-perfluorooctylcyclopentadienyl)(cyclopentadienyl) zirconium dichloride are added thereto. The polymerization temperature of 0° C. is subsequently set and the autoclave is pressurized with 2 bar of propene; the propene pressure is maintained during the polymerization by injection of further amounts. The polymerization is stopped by addition of 20 ml of methanol/2N hydrochloric acid (1:1). The polypropylene obtained is filtered off and dried in an oil pump vacuum.

Activity: 144 g/(mmol·bar·h)

EXAMPLE 19
Polymerization of ethene 200 ml of toluene and 19 ml of 10.5% strength methylaluminoxane solution in toluene are placed in a 1 l glass autoclave. 1 ml of 10.5% strength methylaluminoxane solution in toluene and 16 mg of bis(2', 2', 2'-trifluoroethylcyclopentadienyl)zirconium dichloride are added thereto. The polymerization temperature of 10° C. is subsequently set and the autoclave is pressurized with 2 bar of ethene; the ethene pressure is maintained during the polymerization by injection of further amounts. The polymerization is stopped by addition of 20 ml of methanol/2N hydrochloric acid (1:1). The polyethylene obtained is filtered off and dried in an oil pump vacuum.

Activity: 857 g/(mmol·bar·h)

EXAMPLE 20
Polymerization of ethene 200 ml of toluene and 19 ml of 10.5% strength methylaluminoxane solution in toluene are placed in a 1 l glass autoclave. 1 ml of 10.5% strength methylaluminoxane solution in toluene and 15 mg of bis((1'H, 1'H, 2'H, 2'H-perfluorooctyl)cyclopentadienyl)zirconium dichloride are added thereto. The polymerization temperature of 10° C. is subsequently set and the autoclave is pressurized with 2 bar of ethene; the ethene pressure is maintained during the polymerization by injection of further amounts. The polymerization is stopped by addition of 20 ml of methanol/2N hydrochloric acid (1:1). The polyethylene obtained is filtered off and dried in an oil pump vacuum.

Activity: 600 g/(mmol·bar·h)

EXAMPLE 21
Polymerization of methyl vinyl ketone

A solution of 18 mg of bis(2', 2', 2'-trifluoroethyl) cyclopentadienyl)dimethylzirconium and 82 mg of tris (pentafluorophenyl)borane in 20 ml of methylene chloride is cooled to 0° C. and 2 ml of methyl vinyl ketone are added. The mixture is stirred for 1 hour and then quenched by addition of ml of methanol, after which excess monomer is removed in an oil pump vacuum.

Activity: 3.8 g/(mmol·h)

We claim:

1. A catalyst system comprising
    (a) at least one cocatalyst,
    (b) at least one organometallic compound of the formula (I)

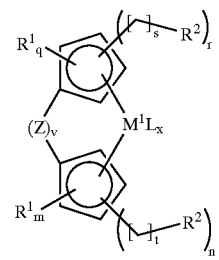

where $M^1$ is a metal of group 3, 4, 5 or 6 of the Periodic Table of the Elements or a lanthanide or actinide, $R^1$ are identical or different and are each a hydrogen atom, a $C_1$–$C_{30}$ group, SiR$^3$, where R$^3$ are identical or different and are each a hydrogen atom or a $C_1$–$C_{40}$ group, or two or more radicals $R^1$ may be joined to one another in such a way that the radicals $R^1$ and the atoms of the cyclopentadienyl ring which connect them form a $C_4$–$C_{24}$ ring system which may in turn be substituted, $R^2$ are identical or different and are each fluorine-containing $C_1$–$C_{25}$-alkyl or fluorine-containing $C_1$–$C_{25}$-alkenyl, r, n are identical or different and are 1, 2, 3, 4 or 5, m, q are identical or different and are 0, 1, 2, 3 or 4, q+r is 5 when v=0, and q+r is 4 when v=1, m+n is 5 when v=0, and m+n is 4 when v=1, s, t are identical or different and are each an integer from 1 to 20, L are identical or different and are each a halogen atom or a hydrocarbon-containing radical having 1–20 carbon atoms, x is an integer from 1 to 4, with x preferably being 2 when $M^1$ =Ti, Zr or Hf, Z is a bridging structural element between the two cyclopentadienyl rings, and v is 0 or 1, and, if desired, (c) at least one support.

2. A catalyst system as claimed in claim 1, wherein, in the formula (I), $M^1$ is titanium, zirconium or hafnium, $R^1$ are identical or different and are each $C_1$–$C_{25}$-alkyl, $C_2$–$C_{25}$-alkenyl, $C_3$–$C_{15}$-alkylalkenyl, $C_6$–$C_{24}$-aryl, $C_5$–$C_{24}$-heteroaryl, $C_7$–$C_{30}$-arylalkyl, $C_7$–$C_{30}$-alkylaryl, $C_1$–$C_{12}$-alkoxy or $SiR^3$, where $R^3$ are identical or different and are each $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, L are identical or different and are each $C_1$–$C_{20}$-alkyl, $C_2$–$C_{20}$-alkenyl, $C_1$–$C_{20}$-alkoxy, $C_6$–$C_{14}$-aryloxy or $C_6$–$C_{40}$-aryl.

3. A catalyst system as claimed in claim 1, wherein, in the formula (I), $R^1$ are identical or different and are each methyl, ethyl, tert-butyl, cyclohexyl, octyl, pyridyl, furyl or quinolyl.

4. A catalyst system as claimed in claim 1, wherein, in the formula (I),

Z is $M^2R^4R^5$, where $M^2$ is carbon, silicon, germanium or tin and $R^4$ and $R^5$ are identical or different and are each a $C_1$–$C_{20}$-hydrocarbon group such as $C_1$–$C_{10}$-alkyl or $C_6$–$C_{14}$-aryl.

5. A catalyst system as claimed in claim 1, wherein, in the formula (I), Z is $CH_2$, $CH_2CH_2$, $CH(CH_3)CH_2$, $CH(C_4H_9)$ $C(CH_3)_2$, $C(CH_3)_2$, $(CH_3)_2Si$, $(CH_3CH_2)_2Si$, $(CH_3)((CH_3)_3C)Si$, $(CH_3)_2Ge$, $(CH_3)_2Sn$, $(C_6H_5)_2Si$, $(C_6H_5)(CH_3)Si$, $(C_6H_5)_2Ge$, $(C_6H_5)_2Sn$, $(CH_2)_4Si$, $CH_2Si(CH_3)_2$, o-$C_6H_4$ or 2,2'-$(C_6H_4)_2$.

6. A process for preparing polyolefins by polymerization of olefins in the presence of at least one catalyst system as claimed in claim 1.

* * * * *

UNITED STATES PATENT AND TRADEMARK OFFICE
CERTIFICATE OF CORRECTION

PATENT NO.    : 6,537,943 B1
DATED         : March 25, 2003
INVENTOR(S)   : Fritze et al.

It is certified that error appears in the above-identified patent and that said Letters Patent is hereby corrected as shown below:

<u>Column 17,</u>
Line 25, "33 μ(mmol·bar·h)" should be -- 33 g/(mmol·bar·h) --.

Signed and Sealed this

Eleventh Day of May, 2004

JON W. DUDAS
*Acting Director of the United States Patent and Trademark Office*